UNITED STATES PATENT OFFICE.

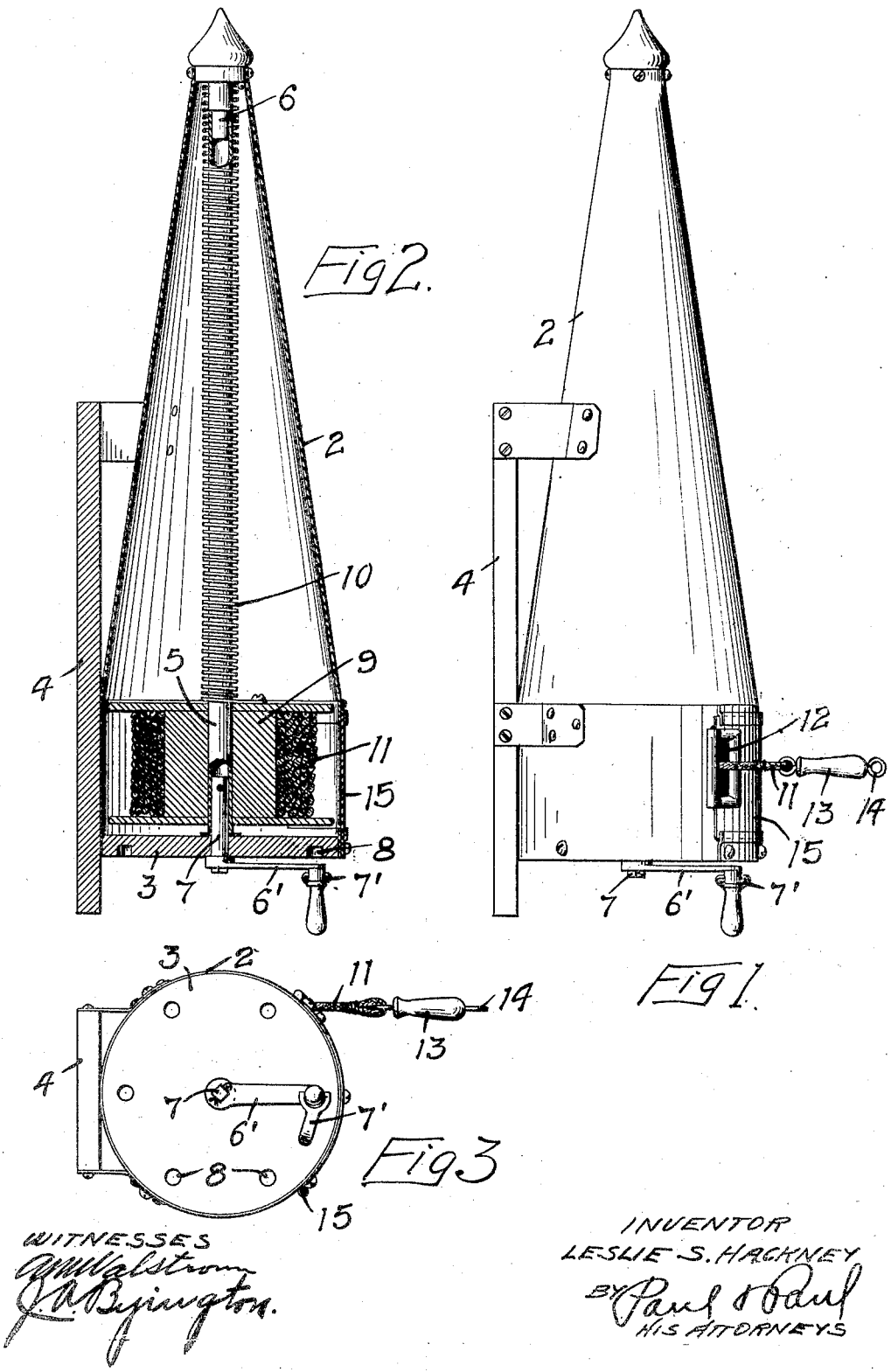

LESLIE S. HACKNEY, OF ST. PAUL, MINNESOTA.

CLOTHES-LINE REEL.

1,016,493.  Specification of Letters Patent.  Patented Feb. 6, 1912.

Application filed December 14, 1908. Serial No. 467,358.

*To all whom it may concern:*

Be it known that I, LESLIE S. HACKNEY, of St. Paul, Ramsey county, Minnesota, have invented certain new and useful Improvements in Clothes-Line Reels, of which the following is a specification.

The object of my invention is to provide a neat, compact reel adapted to contain a clothes line and from which the line may be readily withdrawn for use.

A further object is to provide means for placing the line under tension when it has been strung and ready for use.

A further object is to provide a reel, which will effectually shed rain and snow and thoroughly protect the spring and the operating mechanism from the weather.

The invention consists generally in various constructions and combinations, all as hereinafter described and particularly pointed out in the claim.

In the accompanying drawings, forming part of this specification, Figure 1 is a side elevation of a clothes line reel embodying my invention, Fig. 2 is a vertical, sectional view of the same, Fig. 3 is a bottom view.

In the drawing, 2 represents a cone-shaped shell or casing having a head 3 closing its larger end and provided with a back 4, by means of which the reel may be secured to the post or to the wall of a building. A shaft 5 is provided within said casing having bearings at one end on a stud 6 and at the other end on a short shaft 7 that is mounted in the head 3 and is provided with a crank 6'. A dog 7' is pivoted on said crank and is adapted to engage holes 8 arranged at intervals in said head and lock said crank against revolution. A drum 9 is secured on the shaft 5 and a spring 10 is coiled around said shaft above said drum and is secured at one end to the drum and at the other end to a plug, which fits into the upper end of said casing. A clothes line 11 is attached to said drum and wound thereon and when the drum is revolved to unwind the clothes line, the spring will be put under tension to wind up the line, when it is released. The free end of the clothes line projects through a slot 12 provided in the wall of the casing and is provided with a hand grip 13 having an eye 14, by means of which the hand grip may be attached to a hook or nail at a distant point. A slide 15 covers an opening in the wall of the casing and is capable of being withdrawn to expose the drum and line and permit access thereto.

In the operation of the device the line is drawn out and unwound from the drum and attached at a distant point. The crank is then turned until the line is drawn taut. The dog 7 is then inserted into one of the holes in the head and the crank locked against further movement. As soon as the free end of the line is disengaged from its support, the tension of the spring 10 will rewind it on the drum and the line will be inclosed and thoroughly protected from the weather.

I have found that the conical casing, which I employ in connection with this device will prevent the accumulation of snow and ice thereon and the entrance of drippings therefrom into the interior of the casing and the device will thus be ready for use at all times, even though it is exposed to the storms of summer and winter.

I claim as my invention:—

A clothes line reel comprising a drum, a conical casing vertically mounted thereon, a shaft having bearings in the head of said drum and the apex of said casing, a spool mounted on the lower end of said shaft within said drum, the wall of said drum having an opening through which the clothes line is drawn, a comparatively long spiral spring coiled on said shaft within said cone-shaped casing and attached at one end of said spool, and at its other end to the apex of said casing, the unwinding of the clothes line from said spool putting said spring under tension, and a crank mounted on the lower end of said shaft beneath the drum, and having a locking means and adapted to take up the slack in the line when it is strung for use, substantially as described.

In witness whereof, I have hereunto set my hand this 8th day of Dec. 1908.

LESLIE S. HACKNEY.

Witnesses:
W. L. HACKNEY,
LOUIS JOHNSON.